US008944736B2

(12) United States Patent
Figge et al.

(10) Patent No.: US 8,944,736 B2
(45) Date of Patent: Feb. 3, 2015

(54) FASTENING ELEMENT WITH A TOLERANCE-COMPENSATION FUNCTION

(71) Applicant: Böllhoff Verbindungstechnik GmbH, Bielefeld (DE)

(72) Inventors: Hans-Ulrich Figge, Schloss-Holte (DE); Vanessa Heimann, Paderborn (DE); Ingo Burger, Schloss-Holte (DE)

(73) Assignee: Böllhoff Verbindungstechnik GmbH (DE)

( * ) Notice: Subject to any disclaimer, the term of this patent is extended or adjusted under 35 U.S.C. 154(b) by 0 days.

(21) Appl. No.: 14/126,496

(22) PCT Filed: Oct. 10, 2012

(86) PCT No.: PCT/EP2012/069997
§ 371 (c)(1),
(2) Date: Dec. 16, 2013

(87) PCT Pub. No.: WO2013/060572
PCT Pub. Date: May 2, 2013

(65) Prior Publication Data
US 2014/0227060 A1   Aug. 14, 2014

(30) Foreign Application Priority Data
Oct. 27, 2011   (DE) .......................... 10 2011 054 861

(51) Int. Cl.
*F16B 5/02*        (2006.01)
*B60R 9/058*       (2006.01)
(Continued)

(52) U.S. Cl.
CPC ............... *F16B 35/00* (2013.01); *F16B 5/0233* (2013.01); *B60R 9/058* (2013.01); *F16B 5/02* (2013.01); *F16B 37/067* (2013.01)
USPC .......................................... 411/546; 224/322

(58) Field of Classification Search
CPC ........... F16B 5/0233; F16B 5/02; B60R 9/04; B60R 9/058
USPC ......... 411/546, 535, 512, 350, 298, 539, 352, 411/433, 104; 403/408.1, 229, 343, 47, 403/171, 43, 48, 22; 224/326, 317, 319, 224/322, 329, 331, 309, 325
See application file for complete search history.

(56) References Cited

U.S. PATENT DOCUMENTS 5,782,392 A * 7/1998 Yamamoto .................... 224/326
5,954,251 A * 9/1999 Tress et al. .................... 224/309
(Continued)

FOREIGN PATENT DOCUMENTS

DE    29 39 671 A1 *   4/1981   ................ B60R 9/04
DE    31 21 086 A1     12/1982
(Continued)

OTHER PUBLICATIONS

International Search Report and Written Opinion for PCT/EP2012/069997; dated Dec. 18, 2012; 11 pages.
(Continued)

*Primary Examiner* — Gay Ann Spahn
(74) *Attorney, Agent, or Firm* — Hiscock & Barclay, LLP

(57) ABSTRACT

The present invention relates to a fastening element with a tolerance-compensation function for fastening add-on elements, in particular roof rails. To this end, a threaded bolt is provided which has a threaded region, a fastening region and a projection. A positioning and assistance element is supported on the protection, and an adjustment element is arranged in the threaded region. An add-on element is arranged on the fastening region. A space between a first and a second component can be compensated for with the aid of the positioning and assistance element in cooperation with the adjustment element. Furthermore, a fastening means is arranged on the threaded region, with the result that the second component is arranged between the adjustment element and the fastening means. The add-on element is fixedly connected to the second component by means of the fastening element in this way.

14 Claims, 20 Drawing Sheets

Figure 1:
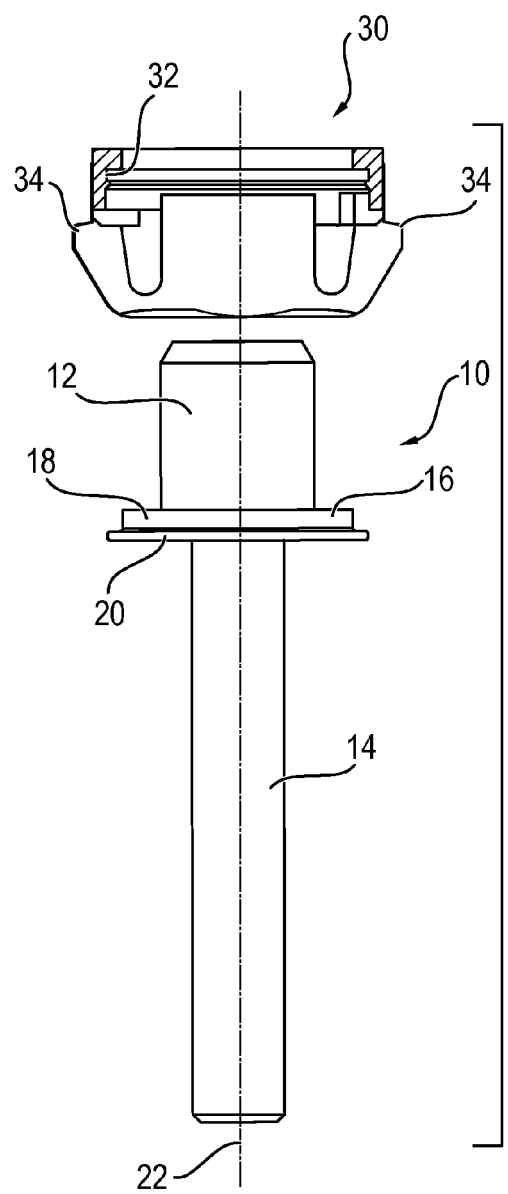

(51) Int. Cl.
*B60R 9/04* (2006.01)
*F16B 35/00* (2006.01)
*F16B 37/06* (2006.01)

(56) References Cited

U.S. PATENT DOCUMENTS

| | | | |
|---|---|---|---|
| 6,350,095 B1 * | 2/2002 | Gross et al. | 411/298 |
| 6,357,953 B1 * | 3/2002 | Ballantyne | 403/43 |
| 6,902,229 B2 * | 6/2005 | Bradbrook et al. | 296/210 |
| 7,025,552 B2 * | 4/2006 | Grubert et al. | 411/546 |
| 7,241,097 B2 | 7/2007 | Dembowsky et al. | |
| 7,356,879 B2 * | 4/2008 | Dembowsky et al. | 16/82 |
| 7,488,135 B2 * | 2/2009 | Hasegawa | 403/48 |
| 7,549,199 B2 * | 6/2009 | Bugner | 403/408.1 |
| 7,588,386 B2 | 9/2009 | Kielczewski et al. | |
| 7,591,403 B2 * | 9/2009 | Binder et al. | 224/325 |
| 7,891,927 B2 * | 2/2011 | Burger et al. | 411/546 |
| 7,980,437 B2 | 7/2011 | Binder et al. | |
| 8,061,948 B2 * | 11/2011 | DeGelis | 411/546 |
| 8,066,465 B2 * | 11/2011 | Figge et al. | 411/546 |
| 8,118,529 B2 * | 2/2012 | Crane et al. | 411/546 |
| 8,202,033 B2 * | 6/2012 | Choi et al. | 411/546 |
| 8,240,966 B2 * | 8/2012 | Figge et al. | 411/546 |
| 8,337,132 B2 * | 12/2012 | Steffenfauseweh et al. | 411/539 |
| 8,720,761 B2 * | 5/2014 | Binder et al. | 224/557 |
| 8,764,337 B2 * | 7/2014 | Binder et al. | 411/546 |
| 8,814,014 B2 * | 8/2014 | Bocker et al. | 224/326 |
| 2005/0025566 A1 * | 2/2005 | Hasegawa | 403/408.1 |
| 2005/0042057 A1 * | 2/2005 | Konig et al. | 411/103 |
| 2005/0102938 A1 | 5/2005 | Binder et al. | |
| 2006/0032016 A1 * | 2/2006 | Dembowsky et al. | 16/82 |
| 2006/0127169 A1 * | 6/2006 | Dembowsky et al. | 403/171 |
| 2006/0280579 A1 * | 12/2006 | Seidl et al. | 411/546 |
| 2007/0009342 A1 * | 1/2007 | Figge et al. | 411/546 |
| 2007/0092355 A1 * | 4/2007 | Burger et al. | 411/535 |
| 2007/0107012 A1 * | 5/2007 | Rachamadugu | 725/34 |
| 2008/0038090 A1 * | 2/2008 | Figge et al. | 411/433 |
| 2008/0193251 A1 * | 8/2008 | Sbongk | 411/104 |
| 2009/0047094 A1 * | 2/2009 | Stone et al. | 411/352 |
| 2009/0190993 A1 * | 7/2009 | De Gelis | 403/47 |
| 2009/0263180 A1 * | 10/2009 | De Gelis | 403/22 |
| 2009/0272865 A1 * | 11/2009 | Crane et al. | 248/274.1 |
| 2011/0243655 A1 * | 10/2011 | Binder et al. | 403/343 |
| 2012/0272506 A1 * | 11/2012 | Figge et al. | 411/350 |
| 2013/0299539 A1 * | 11/2013 | Bocker et al. | 224/309 |
| 2013/0315658 A1 * | 11/2013 | Schwarzbich | 403/229 |
| 2013/0315691 A1 * | 11/2013 | Limpert | 411/512 |
| 2014/0097218 A1 * | 4/2014 | Bittner | 224/309 |

FOREIGN PATENT DOCUMENTS

| | | | | |
|---|---|---|---|---|
| DE | 33 06 360 A1 * | 9/1984 | | B60R 9/04 |
| DE | 34 11 525 A1 * | 10/1985 | | B60R 11/00 |
| DE | 35 24 558 A1 * | 1/1987 | | B60R 9/04 |
| DE | 36 26 926 A1 * | 2/1988 | | B60R 9/04 |
| DE | 37 36 028 C1 * | 2/1989 | | B60R 9/04 |
| DE | 31 21 086 C2 | 4/1989 | | |
| DE | 39 32 193 A1 * | 4/1991 | | B60R 9/058 |
| DE | 92 17 488 U1 | 2/1993 | | |
| DE | 42 40 079 A1 * | 6/1994 | | B60R 9/04 |
| DE | 43 43 093 A1 * | 6/1995 | | B60R 9/04 |
| DE | 196 24 339 A1 * | 1/1998 | | F16D 1/10 |
| DE | 102 39 022 A1 | 3/2004 | | |
| DE | 20 2004 018 079 U1 | 2/2005 | | |
| DE | 10 2005 013 451 B3 * | 10/2006 | | B60R 9/04 |
| DE | 103 54 117 B4 | 8/2007 | | |
| DE | 20 2007 008 154 U1 | 9/2007 | | |
| DE | 10 2006 053 995 B3 * | 4/2008 | | F16B 5/02 |
| DE | 20 2008 002 633 U1 | 6/2008 | | |
| DE | 10 2008 017 859 A1 | 10/2009 | | |
| DE | 10 2008 026 414 A1 | 12/2009 | | |
| DE | 20 2010 002 447 U1 | 6/2010 | | |
| DE | 10 2009 026 245 A1 | 1/2011 | | |
| DE | 10 2010 060 394 A1 * | 5/2011 | | B60R 9/04 |
| DE | 10 2008 062 894 B4 | 7/2011 | | |
| DE | 20 2011 105 943 U1 | 10/2011 | | |
| DE | 20 2014 101 383 U1 * | 5/2014 | | F16B 35/00 |
| EP | 0 476 158 A1 | 3/1992 | | |
| EP | 0 950 569 A1 * | 2/1998 | | B60R 9/04 |
| EP | 1 533 185 A1 * | 9/2004 | | B60R 9/04 |
| EP | 1 764 516 A3 * | 7/2006 | | F16B 5/02 |
| EP | 2 174 836 A1 * | 10/2009 | | B60R 9/058 |
| EP | 2 108 545 B1 | 5/2011 | | |
| EP | 2 130 722 B1 | 7/2011 | | |
| EP | 2 277 742 B1 | 9/2012 | | |
| FR | 2 77 0481 A1 | 5/1999 | | |
| WO | WO 9951450 A1 * | 10/1999 | | B60B 29/00 |
| WO | WO 2008/027476 A2 | 3/2008 | | |
| WO | WO 2008/129854 A1 | 10/2008 | | |
| WO | WO 2009/106261 A1 | 9/2009 | | |

OTHER PUBLICATIONS

International Preliminary Report on Patentability for PCT/EP/2012/069997; dated Apr. 29, 2014; 7 pages.

* cited by examiner

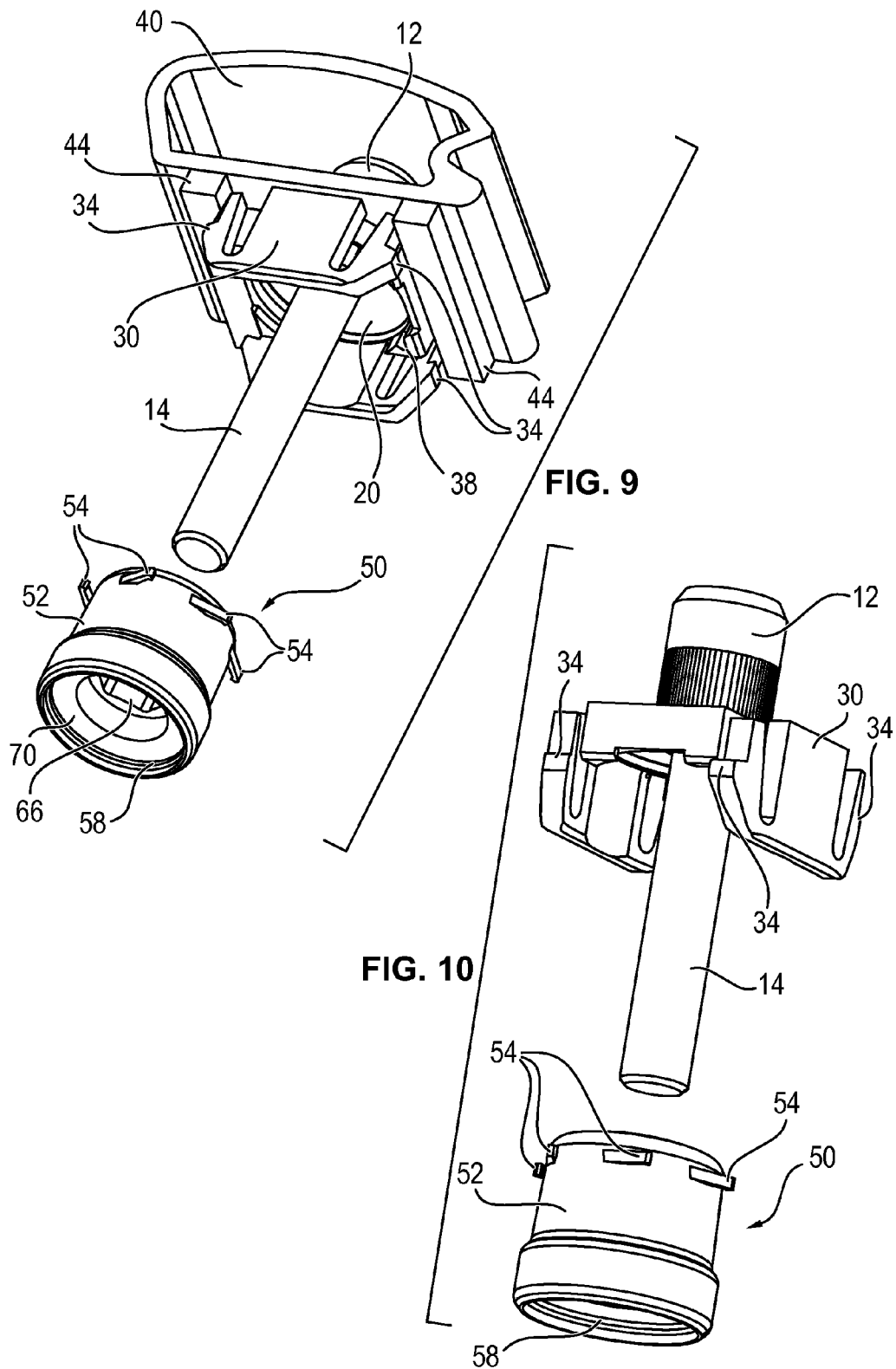

FASTENING ELEMENT WITH A TOLERANCE-COMPENSATION FUNCTION

CROSS-REFERENCE TO RELATED APPLICATION

This application is a national stage application pursuant to 35 U.S.C. §371 of International Application No. PCT/EP2012/069997, filed Oct. 10, 2012, which claims priority upon German Patent Application No. 10 2011 054 861.0, filed Oct. 27, 2011, the entire contents of each application herein being incorporated by reference.

1. FIELD OF THE INVENTION

The present invention relates to a fastening element with a tolerance-compensation function for fastening add-on elements, in particular roof rails, an associated attachment method for such add-on element with the fastening element, and a corresponding removal method.

2. BACKGROUND OF THE INVENTION

Fastening elements are known in the prior art that have a tolerance-compensation function and are used in different technical fields. An example of a fastening element having a tolerance-compensation function is disclosed in DE 103 54 117 B4. The tolerance-compensation element consists of a hollow cylindrical adjustment element that is screwed into a hollow cylindrical main element. The tolerance between two spaced components is compensated by means of the depth at which the hollow cylindrical adjustment element is screwed into the main element. After the tolerance is compensated, a fixed collar encompassing the adjustment element abuts one component, whereas the face of the main element that faces away abuts the other component. This frequently causes bulges in one of the two components if the length of the tolerance-compensation element is not precisely adjusted. A threaded bolt that runs through the tolerance-compensation element is fastened to an add-on element in order to fasten the tolerance-compensation element to the two components.

Another example of a tolerance-compensation element is described in DE 10 2008 026 414 A1. The tolerance-compensation element consists of a hollow cylindrical adjustment element, a hollow cylindrical main element, as well as an annular attachment element that abuts a face of the hollow cylindrical main element in a radially adjustable manner. Given the shape of the attachment element and/or the face of the hollow cylindrical main element, an angled alignment between the central axes of the main and attachment element can thereby be adjusted. The tolerance-compensation element is attached to the two spaced components by means of a threaded bolt.

Another device to fasten a roof rack to a vehicle roof is described in DE 102 39 022 A1. The device has a bolt that is guided from a foot part of the roof rack sitting on the outer layer of the roof through an opening in the outer layer of the roof, as well as an opening in a body panel arranged at a distance below the outer layer of the roof. Furthermore, the device is provided with a counter holder for fastening the bolt to the body panel by means of a nut screwed onto the bolt. The bolt has a bolt part provided with the counter holder that can be moved toward the remaining bolt by adjusting the axial position of the counter holder.

The object of the present invention is to provide a fastening element with a tolerance-compensation function for fastening add-on elements, as well as an attaching and removing method, by means of which the add-on elements can for example be easily fastened to a motor vehicle without deforming the components.

3. SUMMARY OF THE INVENTION

The aforementioned object is achieved by means of a fastening element having a tolerance-compensation function for fastening add-on elements, a roof region of a motor vehicle to which an add-on element is fastened with the fastening element, a method to attach an add-on element by means of the fastening element, as well as a method to remove an add-on element that is fastened with the fastening element. Advantageous embodiments and further developments of the present invention arise from the description, the accompanying drawings and the dependent claims.

The fastening element according to the invention with a tolerance-compensation function for fastening add-on elements, in particular roof rails, has the following features: A threaded bolt having a fastening region for an add-on element, a threaded region as well as a radial projection between the fastening region and the threaded region, a positioning and assistance element that is arranged next to the fastening region on the threaded bolt and abuts the projection, an adjustment element that is arranged in the threaded region such that a distance from the positioning and assistance element is adjustable, and an inner thread that mates with the threaded region, as well as a drive means, wherein the drive means is arranged such that it lies radially inward, and a fastening means that it is arranged in the threaded region next to the adjustment element.

The fastening element according to the invention has the positioning and assistance element as well as the adjustment element arranged on a threaded bolt. The threaded bolt is for example a blind rivet stud. Since the positioning and assistance element abuts the radial projection, the positioning and assistance element does not change its position relative to the threaded bolt, in particular under a subsequent load from a first component. The adjustment element is screwed onto the threaded region of the threaded bolt.

When the fastening element is used, the fastening element is connected to the add-on element, for example a roof rail. Then the fastening element is inserted through an opening in a first component, and an opening in a second component, until the add-on element and the first component are arranged next to each other. The first component can for example be an outer layer of a roof, whereas the second component can be a stable panel such as an interior frame structure. The adjustment element and the positioning and assistance element are arranged between the first and second component. This means that the opening in the first component must be sufficiently large to allow both the adjustment element as well as the positioning and assistance element to pass through. By means of the positioning and assistance element, an alignment and centering function for the fastening element is assumed in the opening in the first component. In particular, the positioning and assistance element is accordingly a centering frame which will be described below in detail. The opening in the second component is chosen so that the threaded region of the threaded bolt can pass through, but not the adjustment element. The adjustment element can accordingly abut the second component.

To compensate for the tolerance, the adjustment element is first screwed toward the second component until it comes into contact or abutment therewith. The adjustment element is screwed with an appropriate tool for the interior drive means. The interior drive means can for example be a polyhedron socket and in particular a hexagon socket, and the adjusting tool can then be a hollow polyhedron, in particular a hollow hexagon.

The adjustment element is subsequently screwed further toward the second component, which causes the positioning and assistance element to move toward the first component. An adjusting tool with torque limitation is preferably used for this procedure since otherwise in particular the first component can bulge. The adjustment element is screwed further toward the second component until the positioning and assistance element is arranged next to the first component, and the tolerance between the first and second component is sufficiently compensated. For this procedure, the positioning and assistance element preferably has stop feet or snapping feet against which the first component can abut. Accordingly, the threaded region of the threaded bolt serves as an adjusting thread in a first function.

Following the above-described tolerance compensation, the fastening means is arranged in the threaded region, in particular, screwed on. This allows the add-on element to be fixedly screwed onto the second component. In a second function, the threaded region of the threaded bolt therefore serves as a fastening thread.

The present fastening element with a tolerance-compensation function fundamentally differs from known systems. The known systems have an adjusting thread pair in addition to the fastening thread. According to the present invention, however, the threaded region of the threaded bolt serves both as a fastening thread for the fastening means, as well as an adjusting thread for the adjustment element. Accordingly, tolerance compensation according to the present invention functions in cooperation with a threaded bolt.

The advantage of the present invention is therefore the simpler construction as well as the greater ease of use in comparison to prior art solutions. Furthermore, this has a positive effect on cost.

In one preferred embodiment, the adjustment element engages with the positioning and assistance element. A transportation lock for the adjustment element on the threaded region of the threaded bolt is thereby provided. In particular, the adjustment element provided in the threaded region cannot accidentally loosen or unscrew.

It is also preferable for the adjustment element to comprise a cap, a hollow cylindrical adjusting top part, as well as an annular adjusting bottom part, and the adjusting top part has the mating inner thread as well as the drive means. The cap can be made of plastic, whereas the adjusting top part and the adjusting bottom part are manufactured from a durable material such as steel. This embodiment is particularly advantageous if the add-on element has a compressible seal. In this case, the adjusting top part and the adjusting bottom part can be held in the cap at a specific distance from the opening in the cap which faces the second component during use. The holding function is preferably realized by means of an interior bead neighboring a second axial end of the cap. The bead can engage with one side of the adjusting bottom part so that the adjusting top part and adjusting bottom part are arranged in the cap. The adjusting bottom part is pressed against the adjusting top part by means of the bead. The adjusting top part in turn is pressed against a lid or a first axial end of the cap. Both the adjusting top part and the adjusting bottom part are therefore securely arranged from being lost in the cap.

When the fastening means is fastened on the threaded region, the adjusting top part is moved together with the adjusting bottom part by means of the bead toward the second component. Seals that can be compressed against the add-on element are thereby compressed. In order to achieve an optimum sealing effect, the distance provided by the bead between the adjusting bottom part and the second component must be equal to the distance established by the compression of the seal. Accordingly, the cap, in cooperation with the adjusting top part and the adjusting bottom part, provides a specific initial tension of the seal against the add-on element when affixing the fastening means.

In an additional preferred embodiment, the cap has at least one interior web on its first axial end, and the adjusting top part has a least one clearance or recess on its first axial end that can be engaged with the at least one interior web. By means of the interplay between the web and recess, the adjusting top part can be held in the cap fixed against rotation.

It is further preferable for the adjusting top part to have a ball socket section on a second axial end, and for the annular adjusting top part to have a ball section on a first side that can be brought into abutment with the ball socket section of the adjusting top part. The annular adjusting bottom part as well as the adjusting top part lie against each other within the cap. If the annular adjusting bottom part is moved in a radial direction relative to a longitudinal axis of the fastening element, the annular adjusting part not only shifts in a lateral direction relative to the longitudinal axis of the fastening element, it also tilts, also relative to the longitudinal axis of the fastening element. The amount of tilting is determined by the inclination of the ball section as well as the ball socket section adapted thereto. Given the radial shift of the adjusting bottom part relative to the longitudinal axis of the fastening element, the central axis of the adjusting bottom part is arranged at an angle relative to the longitudinal axis of the fastening element. This achieves an angular compensation within the geometry between the adjusting top part and adjusting bottom part.

It is further preferable for the cap to have at least one outer peripheral locking pin that is arranged neighboring to the first axial end and can be engaged with the positioning and assistance element. The locking pin serves as a transportation lock.

The present invention also comprises a motor vehicle to which an add-on element, in particular a roof rail, can be fastened by means of the fastening element according to the invention. In view of the arrangement and the resulting advantage, reference is made to the above statements regarding the fastening element according to the invention.

Furthermore, the present invention comprises an attachment method for an add-on element, in particular a roof rail, by means of the fastening element according to the invention with a tolerance-compensation function. The method includes the following steps: Arranging the fastening element on the add-on element, arranging of the add-on element with the fastening element on a first component such that the positioning and assistance element, as well as the adjustment element, are arranged between the first and a second component, adjusting a distance between the positioning and assistance element as well as the adjustment element such that the first component with the positioning and assistance element abuts the second component with the adjustment element, and subsequent attaching a fastening element on the threaded region of the threaded bolt such that the second component is arranged between the adjustment element and the fastening means.

By using the above-described fastening element with a tolerance-compensation function, it is possible to fasten an add-on element to two components, wherein only one element requires adjustment.

It is further preferable to arrange an angle-compensating washer between the second component and the fastening means when fastening the fastening element with the fastening means. The angle-compensating washer helps compensate the angle, particularly in cooperation with the specially designed adjustment element.

The fastening element is preferably arranged on the add-on element by means of rivets to the fastening region of the add-on element. This accordingly establishes a secure and lasting connection between the add-on element and the threaded bolt. The riveting can occur before or after arranging the adjustment element on the threaded region of the threaded bolt.

It is further preferable for the first component to have recesses into which the positioning and assistance element can be clipped, and for the second component to have oblong holes through which an end section of the fastening region projects to fasten the fastening means. In comparison with the prior art, a complex design based on keyholes in the second component and matching holes in the first component is no longer necessary. Furthermore, the add-on element can be arranged fixedly and centered in the opening of the first component by means of the positioning and assistance element.

Likewise, the present invention comprises a removal method for an add-on element, in particular a roof rail that is fastened to a second component by means of the fastening element according to the invention with a tolerance-compensation function, wherein the positioning and assistance element, as well as the adjustment element, are arranged between a first and the second component. The method comprises the following steps: Undoing or releasing the fastening of the fastening element, then lifting the add-on element until the first support element comes into contact with the first component, and subsequently removing the fastening element by means of a suitable removing device.

The removal method makes it possible to subsequently remove the fastening element and hence the add-on element. In particular, no parts of the fastening element are left in the region between the first and the second component.

4. BRIEF DESCRIPTION OF THE ACCOMPANYING DRAWINGS

Figure 2:
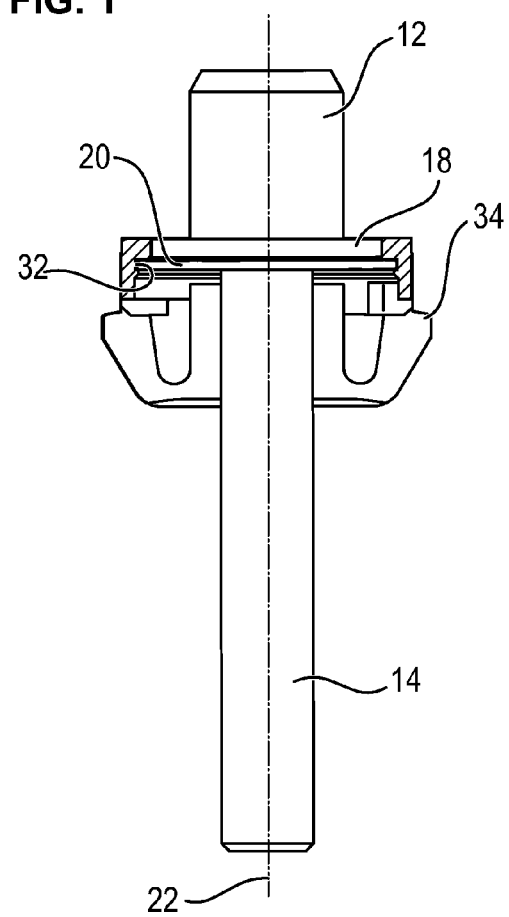
Figure 3:
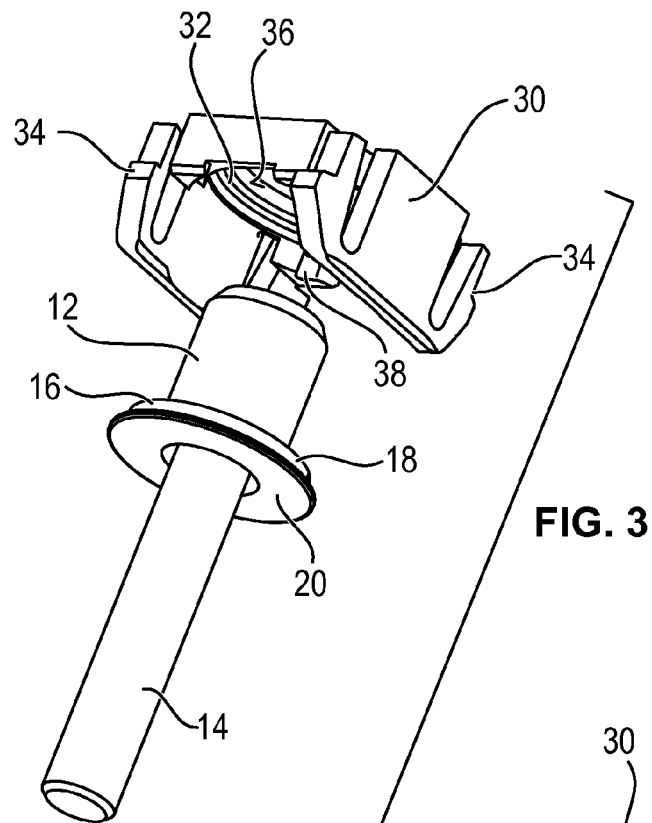
Figure 4:
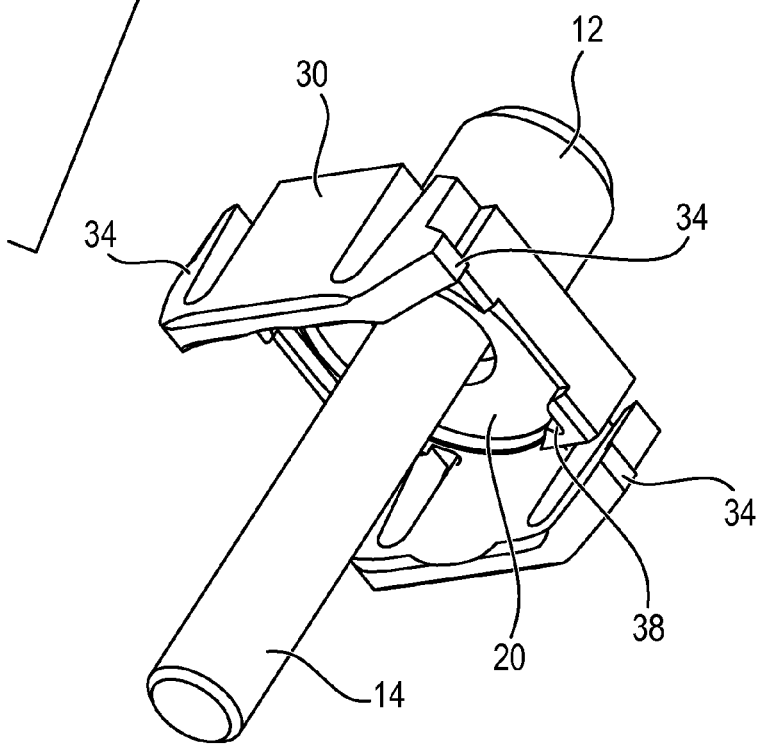
Figure 5:
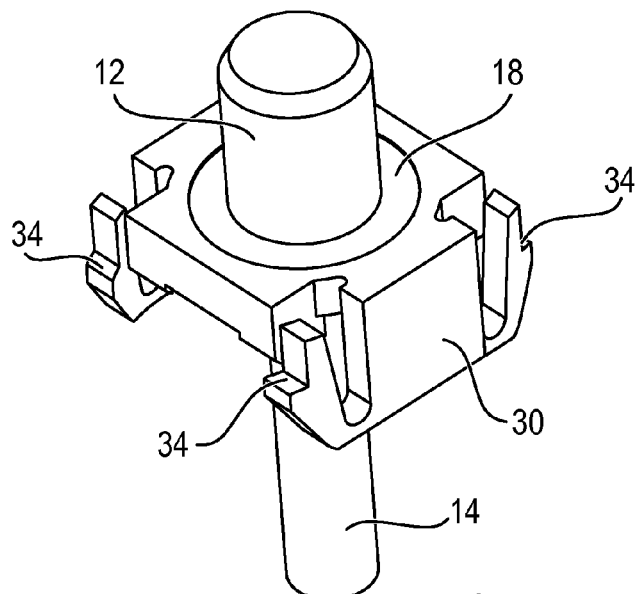
Figure 6:
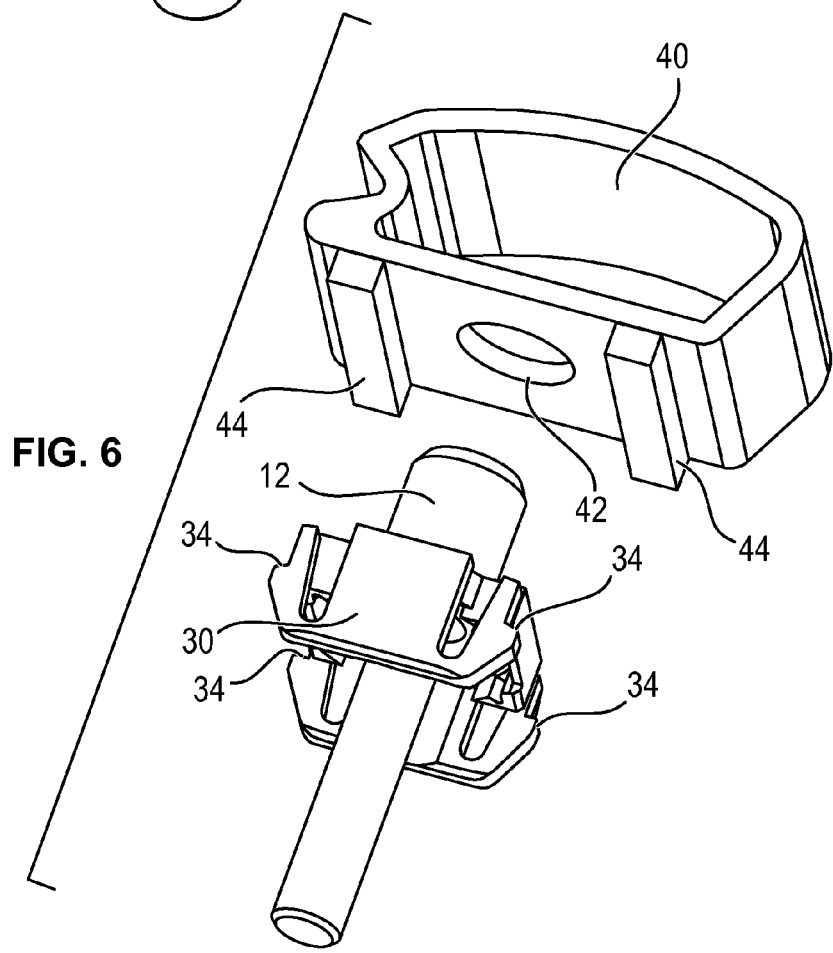
Figure 7:
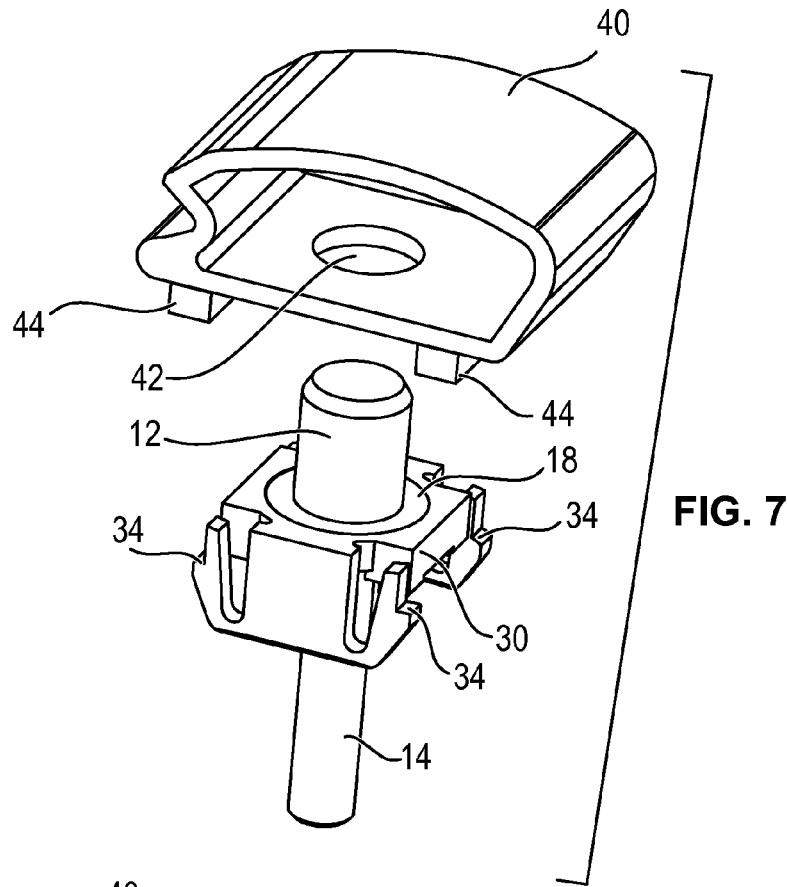
Figure 8:
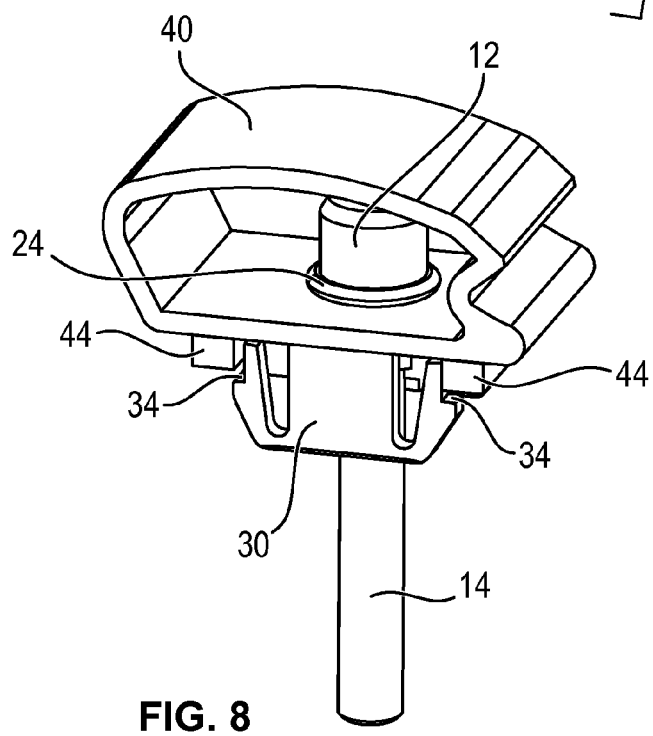
Figure 11:
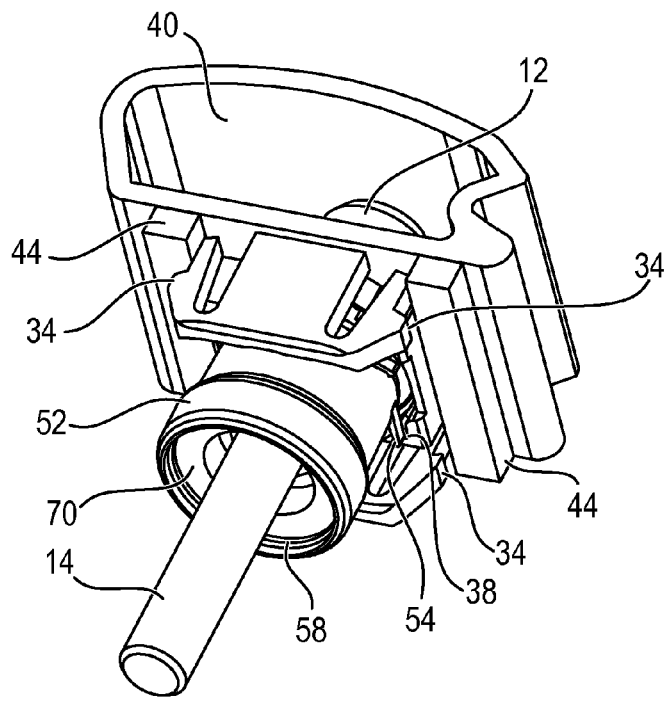
Figure 12:
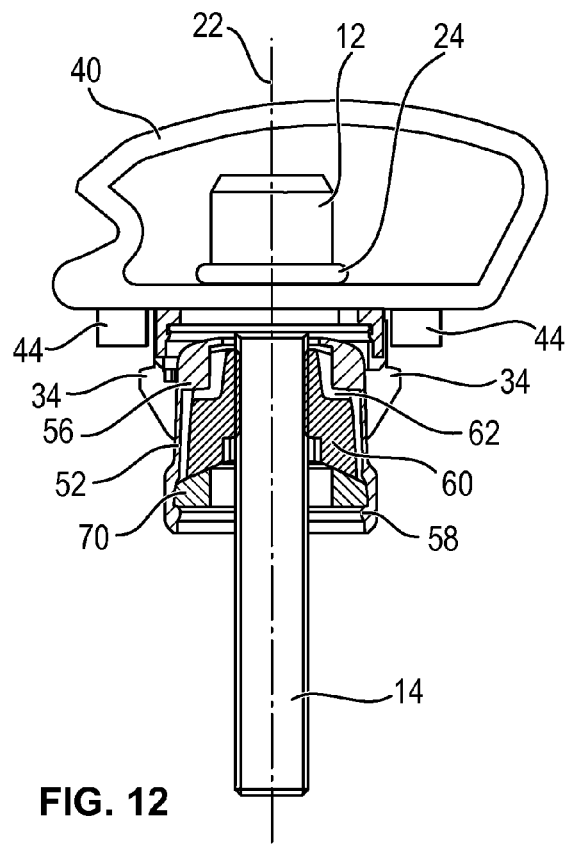
Figure 13:
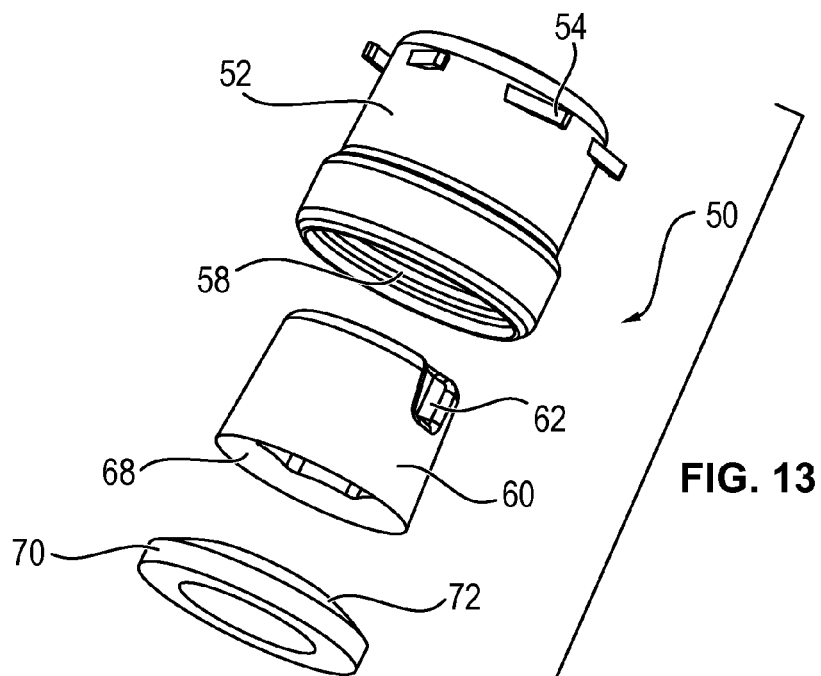
Figure 14:
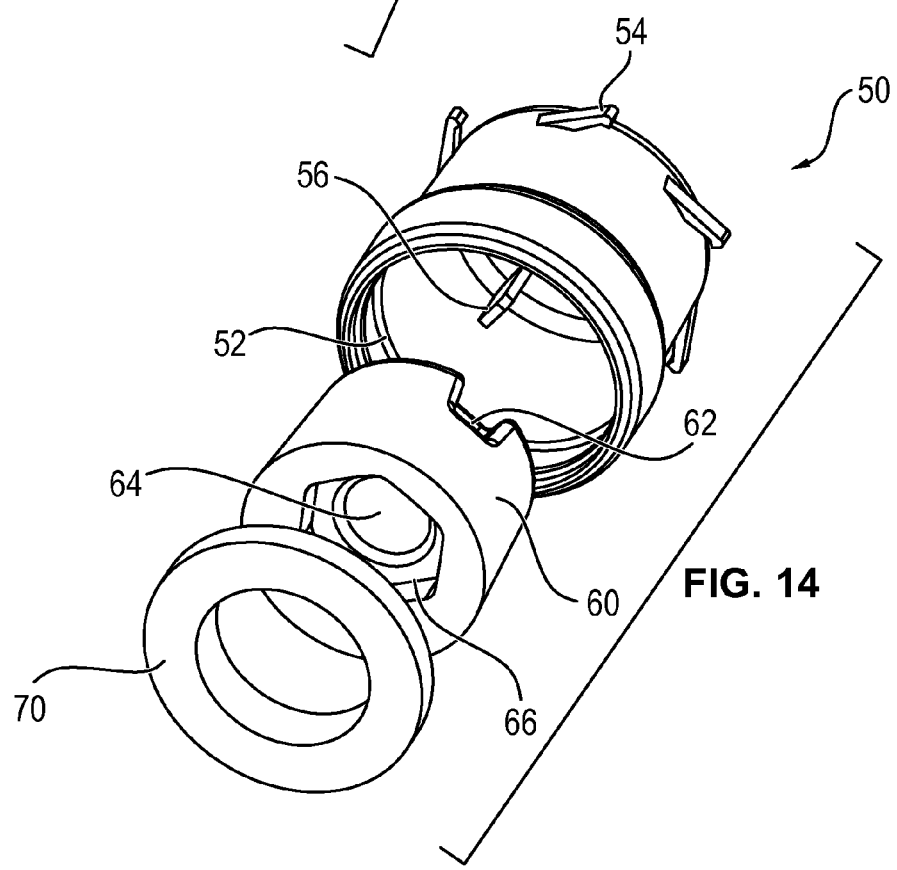
Figure 15:
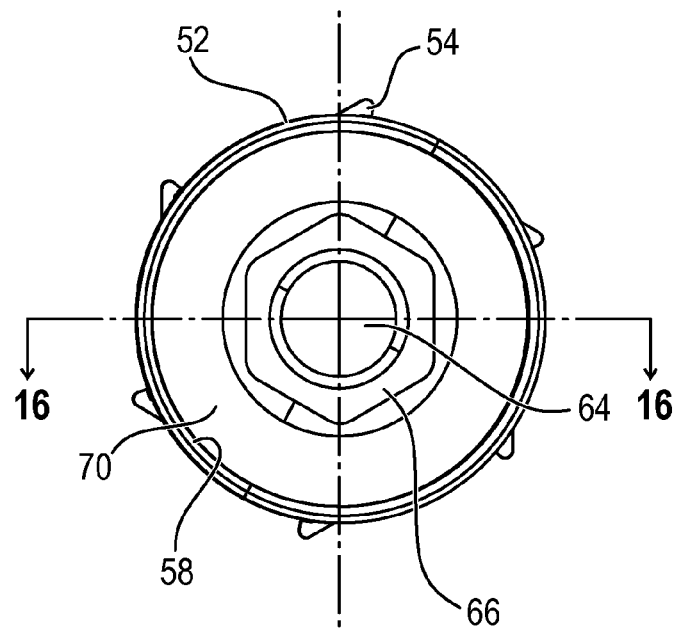
Figure 16:
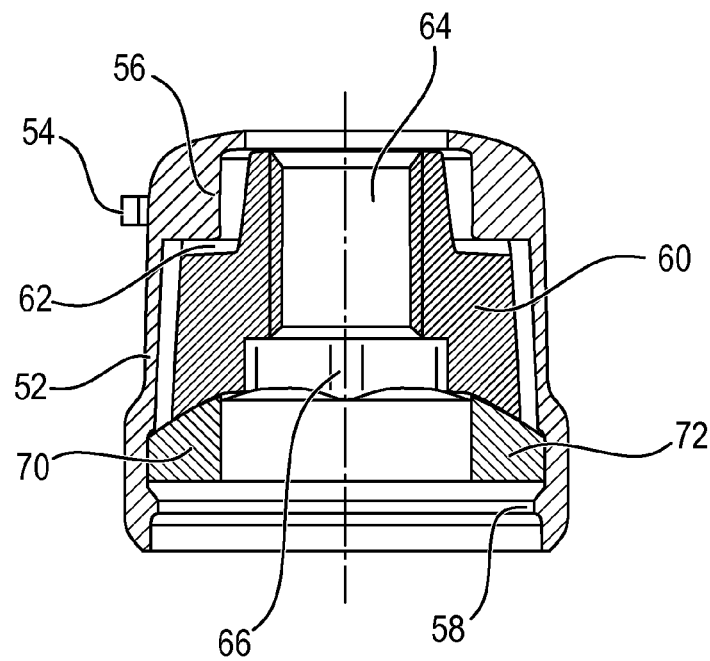
Figure 17:
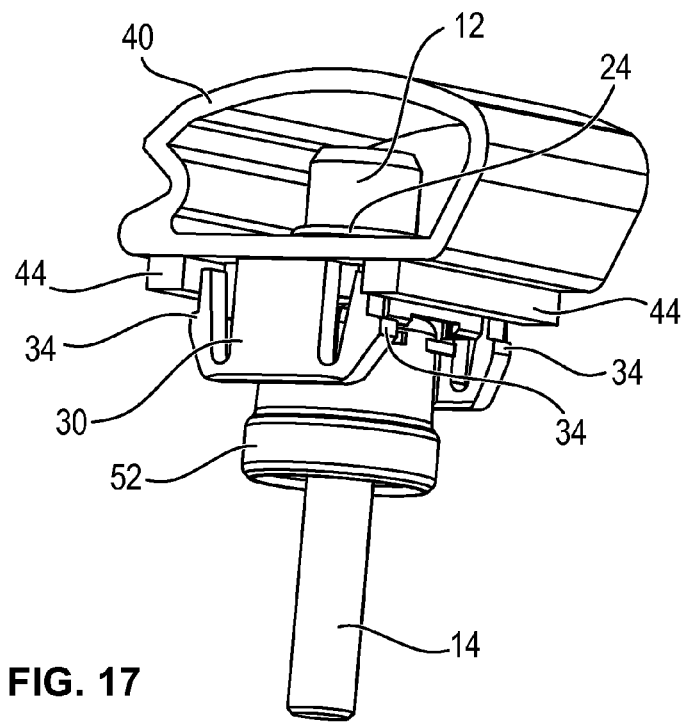
Figure 18:
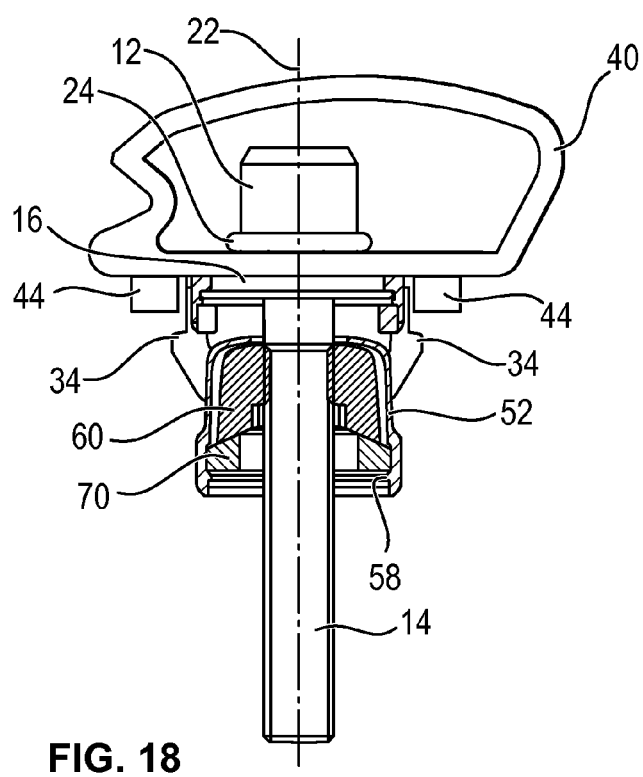
Figure 19:
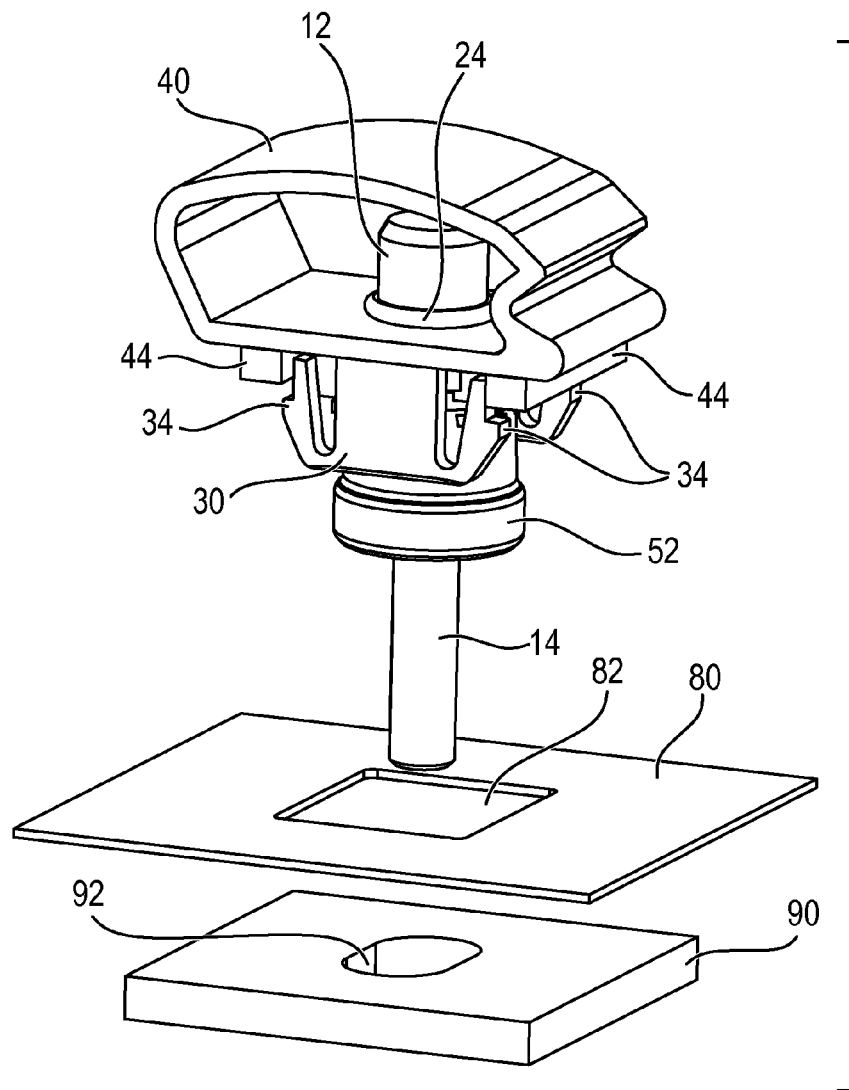
Figure 20:
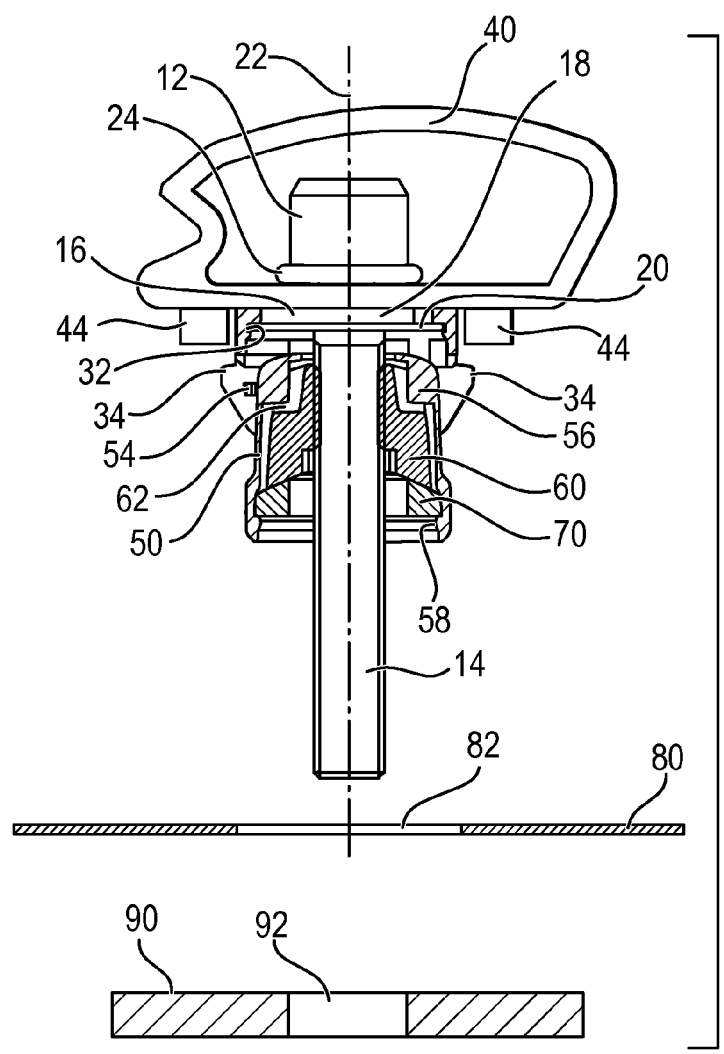
Figure 21:
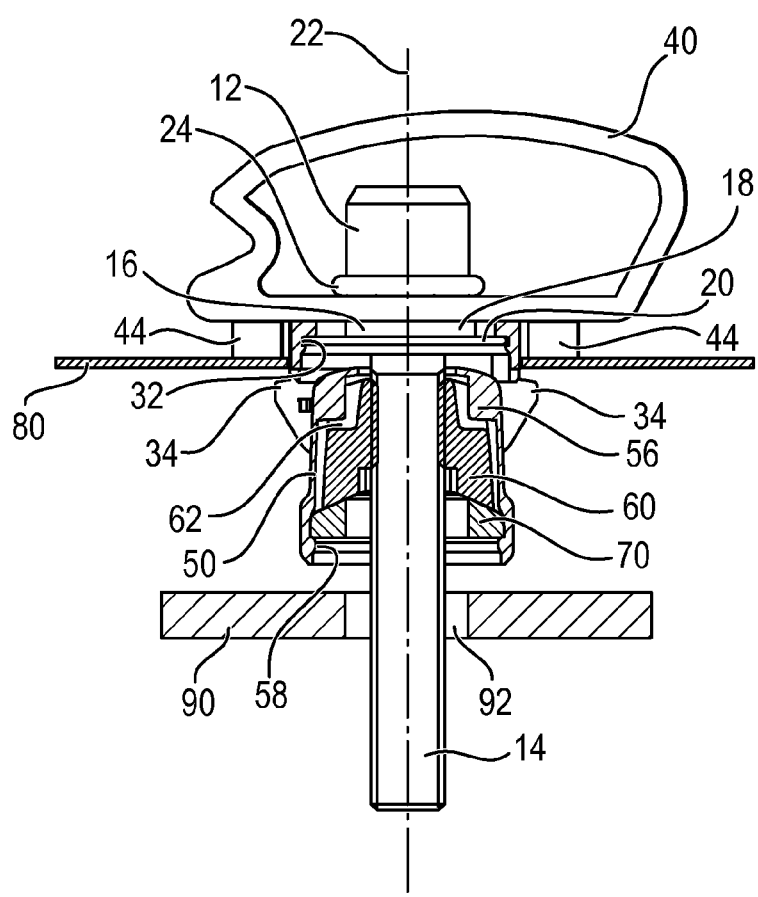
Figure 22:
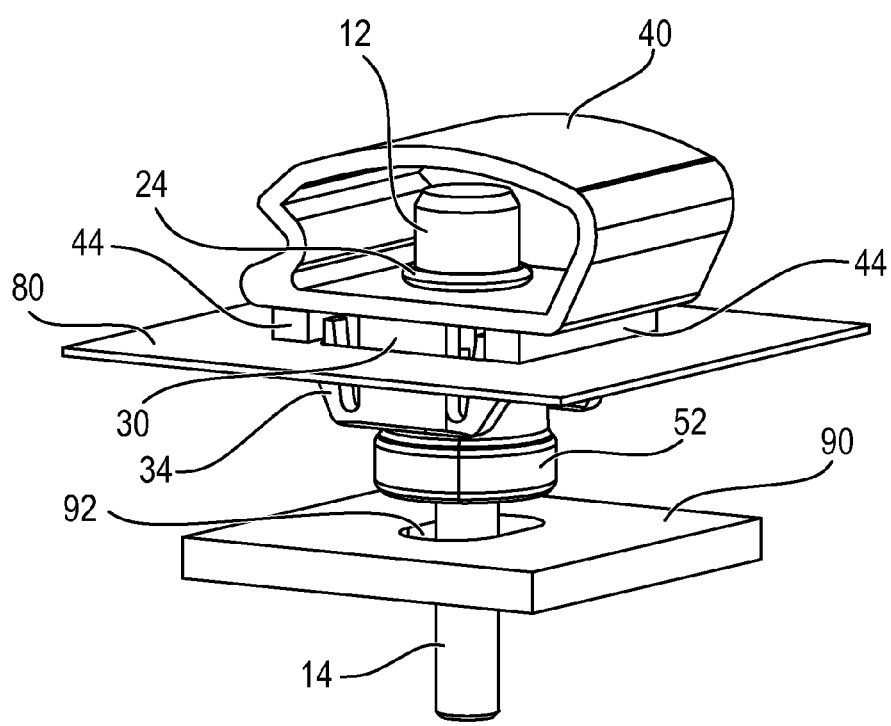
Figure 23:
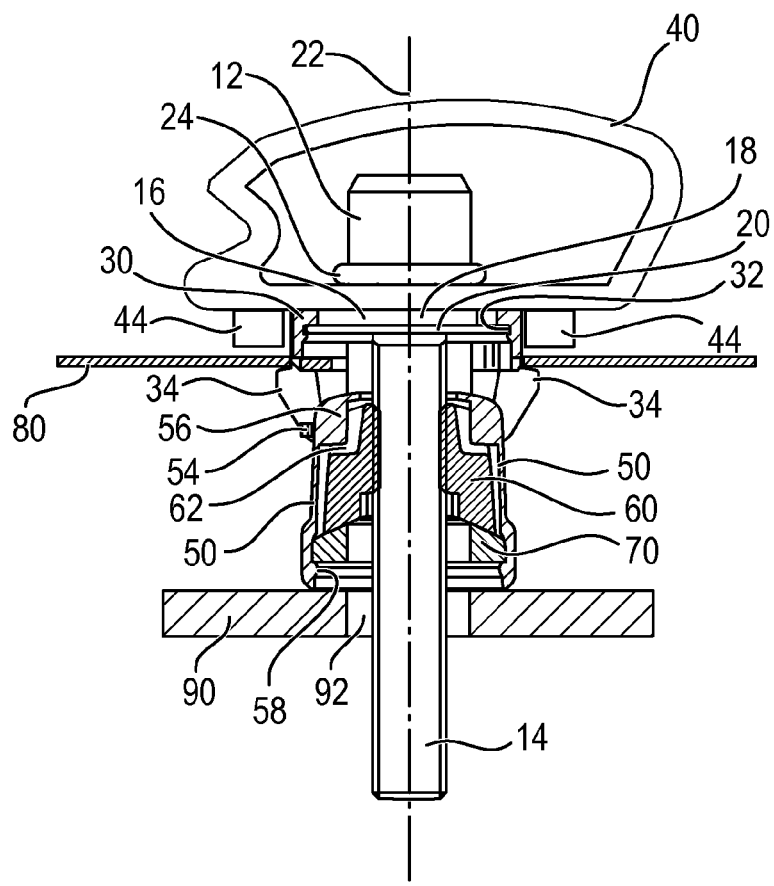
Figure 24:
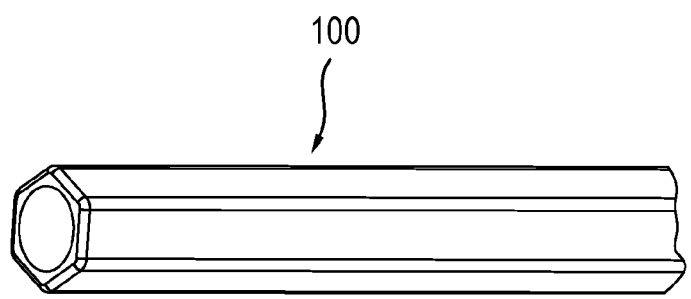
Figure 25:
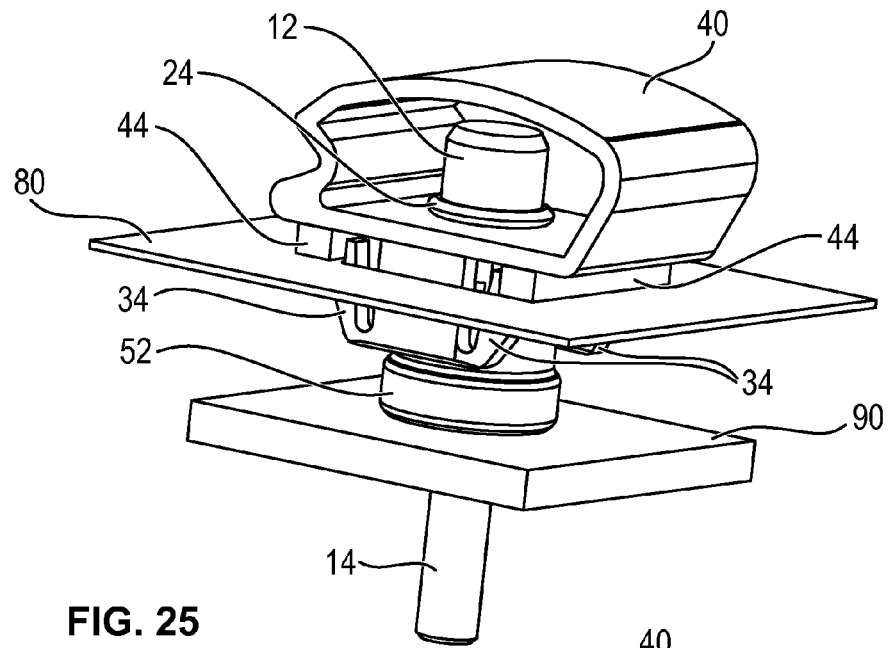
Figure 26:
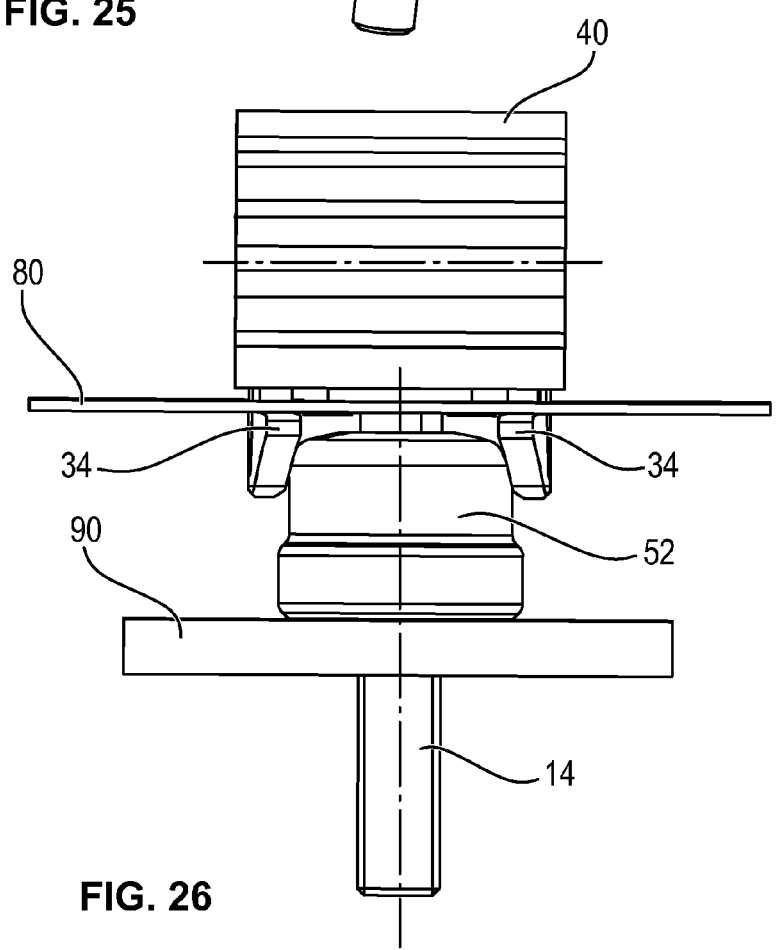
Figure 27:
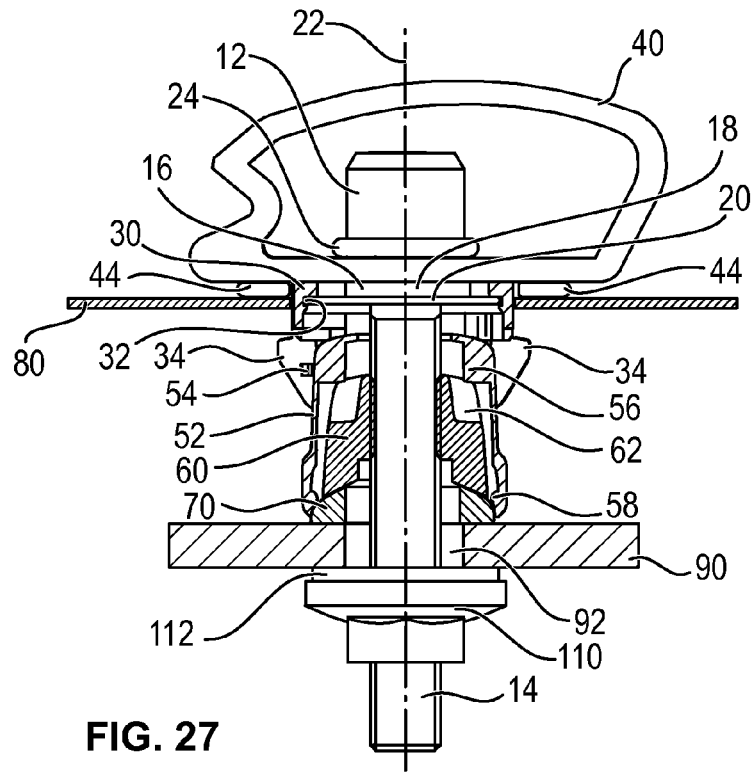
Figure 28:
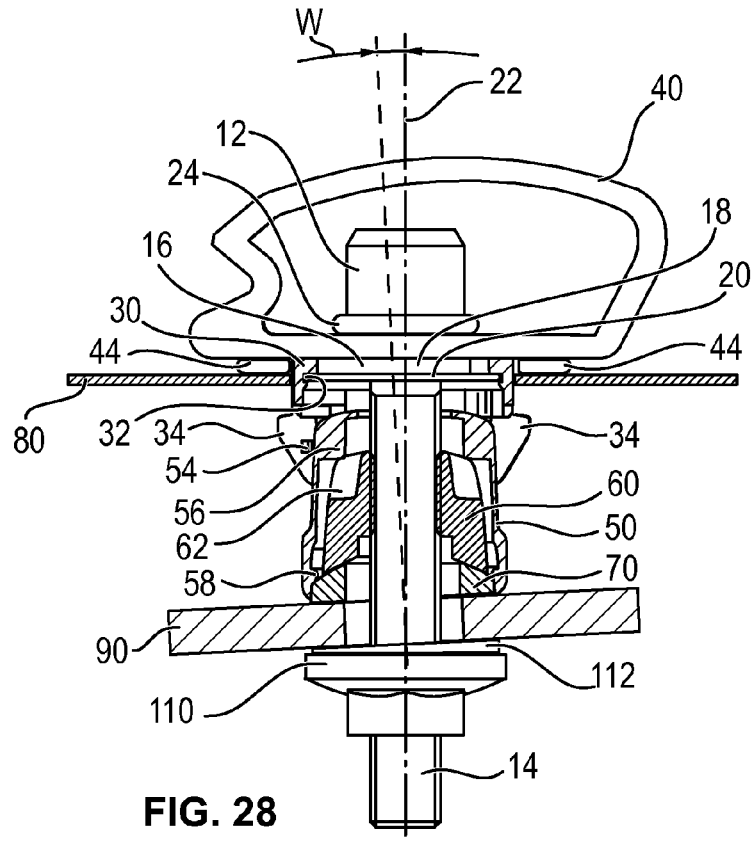
Figure 29:
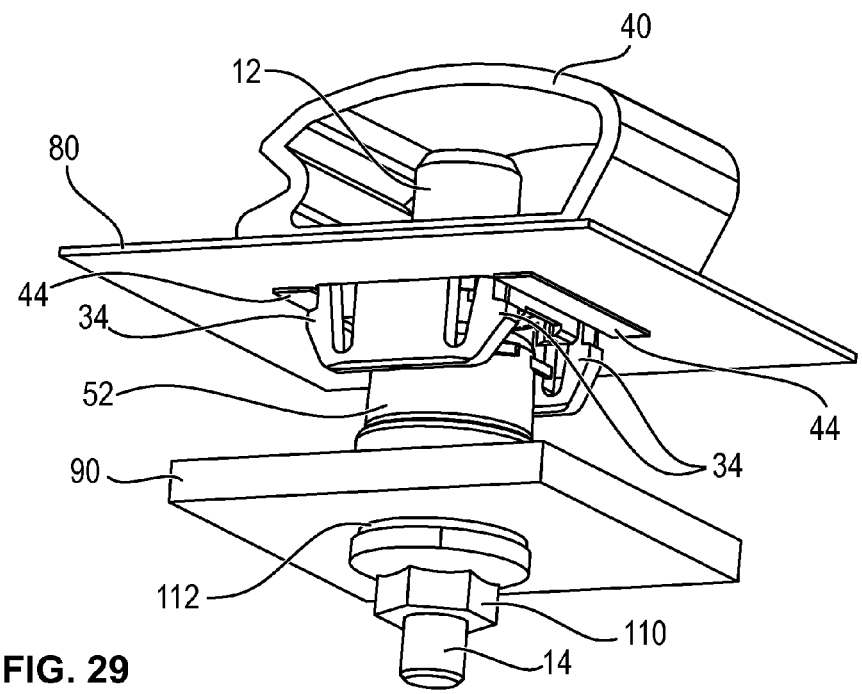
Figure 30:
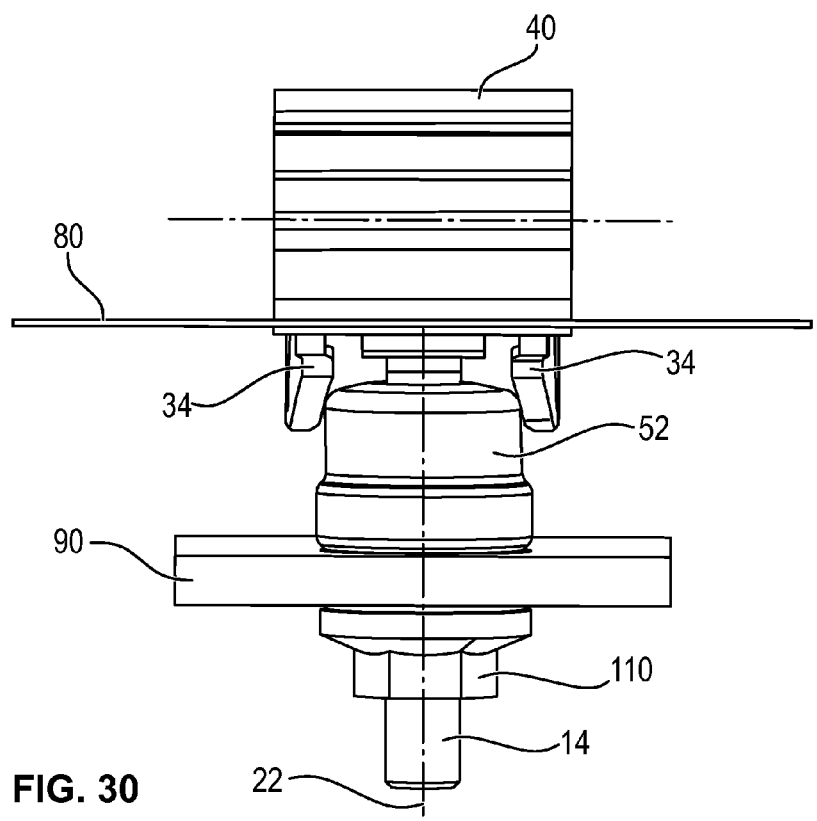
Figure 31:
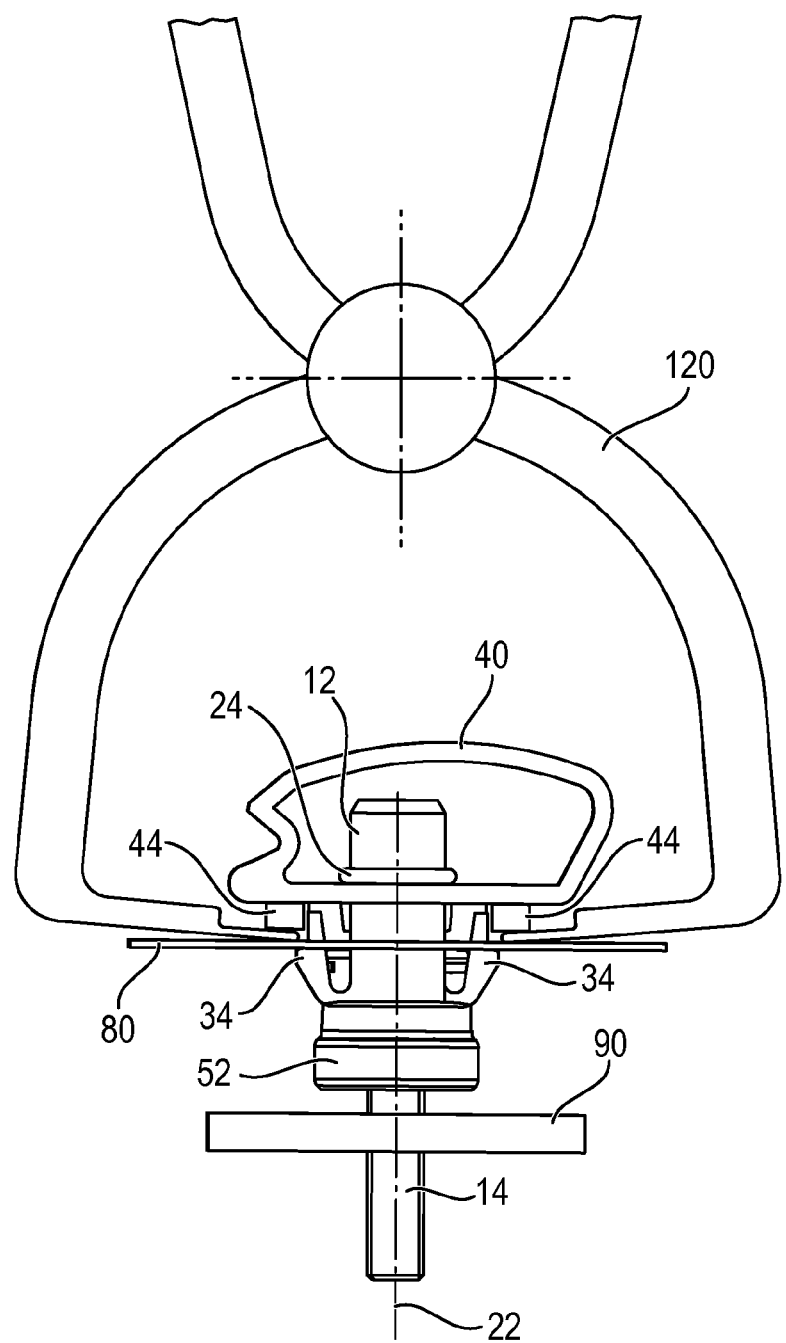
Figure 32:
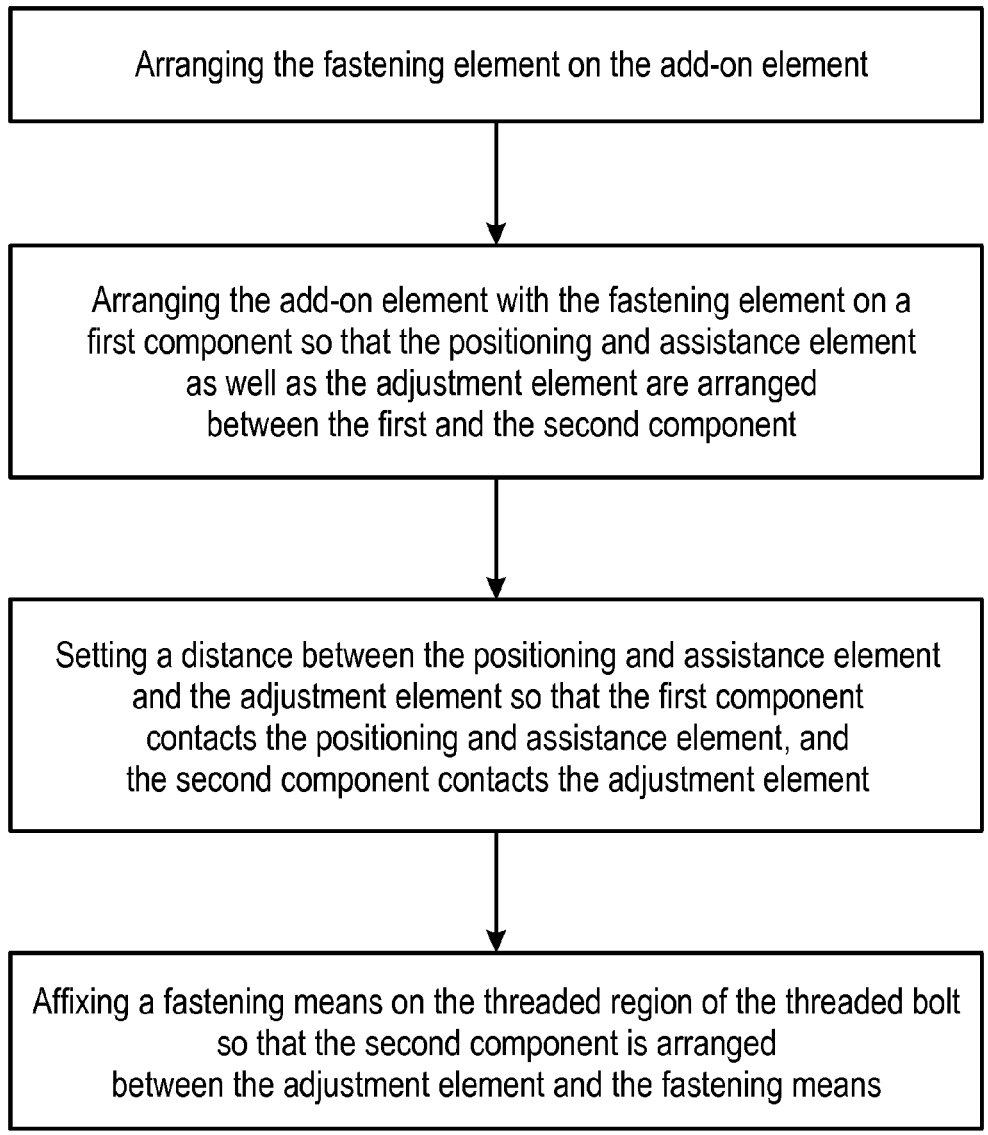
Figure 33:
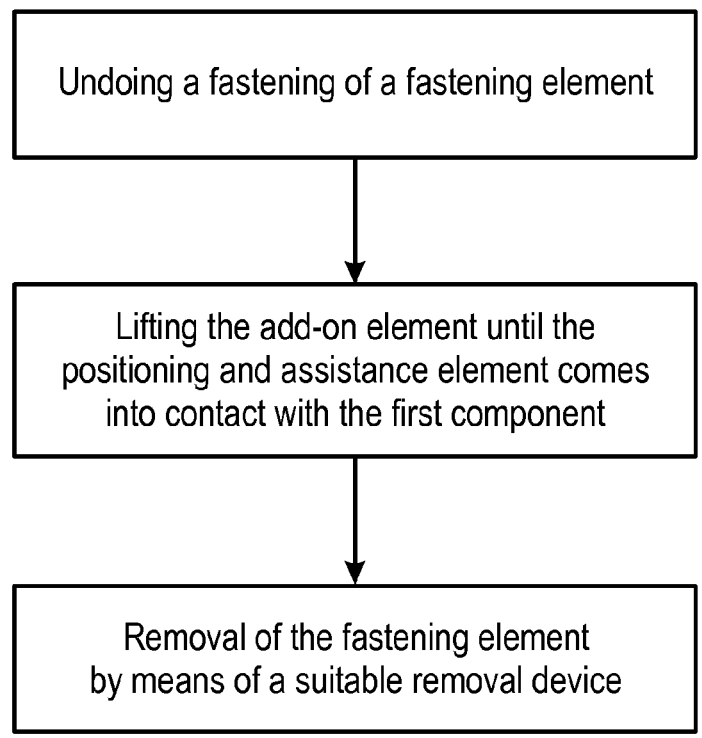

The present invention will be further explained with reference to the accompanying drawings. The same reference numbers in the drawings identify the same elements. In the figures:

FIG. 1 shows a side view of a threaded bolt and a positioning and assistance element according to the present invention, FIG. 2 shows the threaded bolt with the positioning and assistance element according to FIG. 1, wherein the positioning and assistance element is arranged on the threaded bolt, FIG. 3 shows a perspective view of the arrangement according to FIG. 1, FIG. 4 shows a perspective view of the arrangement according to FIG. 2, FIG. 5 shows a perspective view of the arrangement according to FIG. 2, FIG. 6 shows a first perspective view of the threaded bolt with the positioning and assistance element according to FIGS. 1 to 5, as well as an add-on element, FIG. 7 shows a second perspective view of the threaded bolt with the positioning and assistance element according to FIGS. 1 to 5, as well as an add-on element, FIG. 8 shows the threaded bolt with the positioning and assistance element as well as the add-on element according to FIGS. 6 and 7, wherein the add-on element is fastened to the threaded bolt, FIG. 9 shows a perspective view of the arrangement according to FIG. 8 with an adjustment element, FIG. 10 shows a perspective view of the arrangement according to FIGS. 2, 4 and 5 with an adjustment element, FIG. 11 shows a perspective view of the arrangement according to FIG. 9, wherein the adjustment element is arranged in the threaded region, FIG. 12 shows a sectional view of the arrangement according to FIG. 11, FIG. 13 shows a first exploded view of the adjustment element according to the invention, FIG. 14 shows a second exploded view of the adjustment element according to the invention, FIG. 15 shows a plan view of the adjustment element according to the invention, FIG. 16 shows a sectional view of the adjustment element along line 16-16 from FIG. 15, FIG. 17 shows a perspective view of the arrangement according to FIG. 11, FIG. 18 shows a sectional view of the arrangement according to FIG. 17, FIG. 19 shows a perspective view of the arrangement according to FIG. 18 before installation, FIG. 20 shows a sectional view of the arrangement according to FIG. 19, FIG. 21 shows a sectional view of the arrangement according to FIG. 20, wherein the fastening element is inserted between two components, FIG. 22 shows a perspective view of the arrangement according to FIG. 21, FIG. 23 shows a sectional view of the arrangement according to FIG. 21 after a tolerance compensation, FIG. 24 shows a plan view of a drive tool for the tolerance compensation, FIG. 25 shows a perspective view of the arrangement according to FIG. 23, FIG. 26 shows a side view of the arrangement according to FIG. 25, FIG. 27 shows a sectional view of the fastened fastening element, FIG. 28 shows a sectional view from FIG. 27 depicting the angle compensation function, FIG. 29 shows a perspective view of the arrangement according to FIG. 27, FIG. 30 shows a side view of the arrangement according to FIG. 29, FIG. 31 shows a perspective view of the fastening element with a removal device, FIG. 32 shows a schematic flow of a method of the attachment method according to the invention, FIG. 33 shows a schematic flow of a method of a removal method according to the invention.

5. DETAILED DESCRIPTION OF PREFERRED EMBODIMENT

The fastening element with a tolerance-compensation function according to the present invention can be used to fasten add-on elements. Such add-on elements are for example roof rails that are fastened to a roof of a motor vehicle in the automotive field.

According to FIGS. 1 and 3, the fastening element has a threaded bolt 10 as well as a positioning and assistance element 30. The threaded bolt 10 can be a blind rivet stud. The threaded bolt 10 consists of a fastening region 12 and a threaded region 14. A projection 16 is provided between the fastening region 12 and the threaded region 14.

The projection 16 consists of a first region 18 and a second region 20. In particular, the projection 16 extends around the perimeter of the threaded bolt 10. The first region 18 has a smaller radius than the second region 20, and the first region 18 is arranged neighboring the fastening region 12, whereas the second region 20 is arranged neighboring the threaded region 14. A step thereby results between the first 18 and the second region 20. Furthermore, the diameter of the fastening region 12 is greater than that of the threaded region 14. A central longitudinal axis of the threaded bolt 10 is identified with 22.

The positioning and assistance element 30 has a rectangular basic shape. It is preferably made of a plastic and has an annular groove 32 that can engage with the projection 16 of the threaded bolt 10. Furthermore, the positioning and assistance element has four snapping feet or stop feet 34. The stop feet 34 are arranged elastically on the main body of the positioning and assistance element 30. This can be accomplished, for example, by means of a narrow leg or web. On an inner side, or respectively on the side facing the fastening region 12 of the threaded bolt 10, the positioning and assistance element 30 has a recess 38. In particular, a recess 38 is provided in each corner region of the positioning and assistance element 30. The recess 38 subsequently serves as a transportation lock for an adjustment element 50 which will be described below. The positioning and assistance element is in particular a centering frame. The function of the positioning and assistance element or respectively the centering frame will be described in greater detail below when describing the attachment method.

The positioning and assistance element 30 is shoved onto the threaded bolt 10 until the annular groove 32 engages with the projection 16. This is depicted in FIGS. 2, 4 and 5. Furthermore, the positioning and assistance element 30 has a contact surface 36 which engages with a surface of the second region 20 of the projection 16. FIG. 5 shows that the projection 16 interacts in a form fit with the annular groove 32 of the positioning and assistance element 30. In particular, the projection 16 snaps into the annular groove 32. The first region 18 of the projection 16 abuts flush with a surface of the centering frame 30 as shown in FIG. 5.

After the positioning and assistance element has been arranged on the projection 16 of the threaded bolt 10, either the adjustment element 50 can be arranged on the threaded region 14 of the threaded bolt 10, or an add-on element 40 can be arranged on the fastening region 12 of the threaded bolt 10. First, the arrangement of the add-on element 40 on the fastening region 12 of the threaded bolt 10 will be addressed.

This add-on element 40 can be a roof rail, normally an extruded section made of light metal. The add-on element 40 has a plurality of holes 42, of which only one is depicted in FIGS. 6 and 7. The holes 42 in the add-on element 40 and the fastening region 12 of the threaded bolt 10 are sequentially engaged with each other (see FIG. 8). This is accomplished in particular by means of riveting the fastening region 12 in the add-on element 40. A metal connection thereby arises between the add-on element 40 and the fastening region 12. A bead 24 arises within the add-on element 40 due to the riveting. The fastening region 12 is therefore firmly connected to the add-on element 40. Furthermore, the positioning and assistance element is securely held between the projection 16 and a side of the add-on element 40 facing the projection 16.

Furthermore, the add-on element 40 has two parallel seals 44 on its side facing the positioning and assistance element 30. The seals 44 are compressible seals that for example are fastened by means of an adhesive bond to the add-on element 40. As also shown in FIG. 8, the correct position of the positioning and assistance element 30 is achieved with the assistance of seals 44 that engage with the stop feet 34. If seals are not used, the function can be realized by a corresponding groove in the add-on element 40 that engages with a web on the positioning and assistance element 30.

An adjustment element 50 is additionally depicted in FIGS. 9 and 10. As already mentioned above, the adjustment element 50 can be arranged on the threaded bolt 10 after arranging the add-on element 40 (FIG. 9), or before arranging the add-on element 40 (FIG. 10). The detailed structure of the adjustment element 50 will be described below with reference to FIGS. 13-16.

The adjustment element 50 is screwed onto the threaded region 14 of the threaded bolt 10. For this purpose the adjustment element 50 has an inner thread. Furthermore, the adjustment element 50 can have projections or locking pins 54 at a radial outside that can to be brought into engagement with the recesses 38 in the positioning and assistance element 30. The adjustment element 50 is preferably screwed on until a first locking pin 54 radially contacts and snaps into one of the recesses 38. This constitutes the transportation lock. FIG. 11 shows a perspective view, and FIG. 12 shows a sectional view of the threaded bolt 10 with the positioning and assistance element 30 arranged thereupon, as well as the adjustment element and the add-on element 40.

The adjustment element 50 will be described below with reference to FIGS. 12 to 16. The adjustment element 50 consists of a cap 52, an adjusting top part 60 and an adjusting bottom part 70. The cap 52 is preferably made of plastic. The adjusting top part 60 as well as the adjusting bottom part 70 are made of steel or another suitable metal.

The adjusting top part 60 is hollow cylindrically shaped and has the inner thread that mates with the threaded region 14 of the threaded bolt 10. As can be seen in FIGS. 13 and 14, the adjusting top part 60 has a ball socket section 68 that interacts with a ball section 72 of the adjusting bottom part 70. The adjusting bottom part 70 is preferably annular and has a hole in the middle such that it can be shoved onto the threaded region 14 of the threaded bolt 10. The side of the adjusting bottom part 70 facing the ball section 72 is designed flat. The interaction between the ball socket section 68 and ball section 72 serves for angle compensation as will be described later.

At its first axial end or respectively its lid, the cap 52 has an opening so that the cap 52 can be shoved over the threaded region 14 of the threaded bolt 10. The cap 52 is open at its second axial end. The cap 52 has two mutually opposing webs or bars 56. The adjusting top part 60 has two clearances or recesses 62 that can be brought into engagement with the bars 56. The adjusting top part 60 is introduced into the cap 52 until the bar 56 engages with the recesses 62. The adjusting top part 60 is thereby secured against rotating in the cap 52.

Then the adjusting bottom part 70 is arranged in the cap 52. An internal bead 58 in the cap 52 is provided for this that holds the adjusting bottom part 70 in the cap 52. The cap also has an internal projection against which the ball section 72 abuts in this state. Likewise, the ball section 72 of the adjusting bottom part 70 abuts against the ball socket section 68 of the adjusting upper part 60. Accordingly, the adjusting upper part 60 and the adjusting bottom part 70 are held within the cap 52 by the bead 58.

Furthermore, the adjusting top part 60 has drive means 66 lying radially inward. In the shown example, this is a hexagon socket. With the assistance of the drive means 66, a desired distance is set between the positioning and assistance element 30 as well as the adjustment element 50 to compensate for tolerance.

The attachment method will now be described in detail with reference to FIGS. 19 and 20 as well as the schematic method steps in FIG. 32. First, the threaded bolt 10 equipped with the positioning and assistance element 30 is fastened, in particular riveted, to the add-on element 40. This is done for each hole 42 in the add-on element 40. Subsequently, the adjustment element is arranged on the threaded region 14 of the threaded bolt 10. Alternatively, the threaded region 14 can be equipped with the adjustment element 50 before fastening to the add-on element 40.

After the fastening element has been arranged in step A on the add-on element 40, the add-on element 40 is arranged on the first component 80. The first component 80 is for example the outer layer of the roof of a motor vehicle. Since the first component is a normally very thin component in comparison to the second component 90, the first component 80 should not absorb any fastening force for fastening the add-on element 40. The first component 80 has openings 82, preferably rectangular punched holes.

The add-on element 40 is inserted with the fastening element through the opening 82 and into an opening 92 in a second component 90. The opening 92 of the second component 90 is preferably an oblong hole or slot. The second component 90 is for example an inner panel of a motor vehicle or a frame structure. The fastening element is inserted such that the positioning and assistance element 30, as well as the adjustment element 50, are arranged in an intermediate space between the first component 80 and the second component 90 (see FIGS. 21 and 22). The seals 44 thereby come in contact with the first component 80 without any stress.

With the assistance of the tool 100 depicted in FIG. 24, the adjusting top part 60 is screwed downward toward the second component 90 until the cap 52 lies against the second component 90. The tool 100 in the present case is designed as a hexagon which has a release for the threaded region 14 of the threaded bolt 10.

Upon screwing further, the add-on element 40 with its seals 44 lift off of the first component 80. This is done until the stop feet 34 of the positioning and assistance element 30 come into contact with the first component 80 (see FIGS. 23, 25, and 26). The stop feet of the positioning and assistance element 30 therefore function to align or center the threaded bolt 10 in the opening 82 of the first component 80. A noticeable resistance occurs when the stop feet 34 press against the first component 80. In contrast, mounting the cap 52 on the second component 90 is, however, scarcely noticeable when the weight of the add-on element, such as the relevant roof rail, is only slight, it is therefore preferable for the tool 100 to have a torque limiter so that the first component 80 is not deformed. The distance between the first component and the second component is thereby compensated (step C).

As shown in FIGS. 27 to 30, the threaded bolt 10 with the adjusting top part 60 and adjusting bottom part 70 is moved downward by unscrewing the fastening means (step D). The adjusting bottom part 70 is pressed by the adjusting top part 60 over the bead 58 of, the cap 52 until the adjusting bottom part 70 comes into contact with the second component 90. The seals of the add-on element 40 are compressed by means of this procedure. The add-on element 40 and first component 80 are therefore brought to the desired spacing. The desired spacing is defined by the bead 58 in the cap 52.

By tightening the fastening means 110, in this case a fastening nut, the adjusting top part 60 is tightened on the threaded bolt 10 with the fastening means 110. A high-strength screwed connection results. Furthermore, the add-on element 40 is fastened to the second component 90 which is stable in comparison to the first component 80. The first component 80 only served as a guide and only needs to absorb the force of the seal pressure.

If the first component 80 and the second component 90 are not parallel to each other, this can be compensated by means of the fastening element according to the invention. The annular ball socket section 68 of the adjusting top part 60 can move in all directions on the annular ball section 72 of the adjusting bottom part 70 and compensate a maximum angle of W. This is enabled after the adjusting bottom part 70 is brought into contact with the second component 90. Furthermore in this case, it is preferable to use an angle-compensating washer 112.

The removal method according to the invention will be explained below with reference to FIGS. 31 and 33. In step A, the fastening of the fastening element is undone. To accomplish this, the fastening means 110 is unscrewed. Then, in step B, the add-on element 40 is lifted until the positioning and assistance element 30 comes into contact with the first component 80. The stop feet 34 of the positioning and assistance element 30 thereby come in contact with the first component 80. A gap arises between the seals 44 and the first component 80. The fastening element is removed through this gap with the assistance of a suitable removal device 120. For example, the stop feet 34 of the positioning and assistance element 30 are compressed by means of a specially shaped tip of pliers for removal. One connection after the other can thereby be undone, and the add-on element can be completely removed.

LIST OF REFERENCE NUMBERS

10 Threaded bolt
12 Fastening region
14 Threaded region
16 Projection
18 First region
20 Second region
22 Longitudinal axis
24 Bead
30 Positioning and assistance element
32 Annular groove
34 Snapping feet/Stop feet
36 Contact surface
38 Recess
40 Add-on element
42 Hole
44 Seal
50 Adjustment element
52 Cap
54 Locking pin
56 Web/Leg/Bar
58 Bead
60 Adjusting top part
62 Clearance/Recess
64 Hole
66 Drive means
68 Ball socket section
70 Adjusting bottom part
72 Ball section
80 First component
82 Opening
90 Second component
92 Opening
100 Tool
110 Fastening means
112 Washer
120 Removing device

The invention claimed is:

1. A fastening element having a tolerance-compensation function for fastening add-on elements in particular roof rails, said fastening element comprising the following features:
   a) a threaded bolt having a fastening region for an add-on element, a threaded region and a radial projection between the fastening region and threaded region,
   b) a positioning and assistance element that is arranged neighboring the fastening region on the threaded bolt and abutting the projection,
   c) an adjustment element that is arranged in the threaded region such that a distance can be adjusted relative to the positioning and assistance element, said adjustment element having an inner thread that mates with the threaded region, as well as drive means, wherein the drive means are arranged radially to the inside, and
   d) fastening means that is arranged in the threaded region neighboring the adjustment element.

2. The fastening element according to claim 1, wherein the adjustment element engages with the positioning and assistance element.

3. The fastening element according to claim 1, wherein the adjustment element comprises a cap, a hollow cylindrically shaped adjusting top part, as well as an annular adjusting bottom part, wherein the adjusting top part includes the mating inner thread as well and the drive means.

4. The fastening element according to claim 3, wherein the cap has at least one interior web neighboring a first axial end, and the adjusting top part has a least one recess on its first axial end that can be engaged with the at least one interior web.

5. The fastening element according to claim 3, wherein the adjusting top part has a ball socket section on a second axial end, and the annular adjusting bottom part has a ball section on a first side that can be brought into contact with the ball socket section of the adjusting top part.

6. The fastening element according to claim 3, wherein the cap has an interior bead neighboring a second axial end, wherein the bead can be engaged with a second side of the annular adjusting bottom part so that the adjusting top part and the adjusting bottom part can be arranged in the cap.

7. The fastening element according to claim 3, wherein the cap has at least one outer peripheral locking pin that is arranged neighboring the first axial end, and with which the positioning and assistance element can be engaged.

8. The fastening element according to claim 1, wherein the positioning and assistance element is a centering frame.

9. The fastening element according to claim 8, wherein the positioning and assistance element has snapping feet.

10. The fastening element according to claim 1, wherein the drive means is a polygonal socket.

11. The fastening element according to claim 1, wherein the threaded bolt is a blind rivet screw.

12. The fastening element according to claim 4, wherein the adjusting top part has a ball socket section on a second axial end, and the annular adjusting bottom part has a ball section on a first side that can be brought into contact with the ball socket section of the adjusting top part.

13. The fastening element according to claim 4, wherein the cap has an interior bead neighboring a second axial end, wherein the bead can be engaged with a second side of the annular adjusting bottom part so that the adjusting top part and the adjusting bottom part can be arranged in the cap.

14. The fastening element according to claim 4, wherein the cap has at least one outer peripheral locking pin that is arranged neighboring the first axial end, and with which the positioning and assistance element can be engaged.

* * * * *